(12) United States Patent
Pomar

(10) Patent No.: US 10,830,125 B2
(45) Date of Patent: Nov. 10, 2020

(54) HYDROGEN GENERATOR AND NON-POLLUTING INNER COMBUSTION ENGINE FOR DRIVING VEHICLES

(71) Applicant: Eliodoro Pomar, Torremolinos-Malaga (ES)

(72) Inventor: Eliodoro Pomar, Torremolinos-Malaga (ES)

(*) Notice: Subject to any disclaimer, the term of this patent is extended or adjusted under 35 U.S.C. 154(b) by 142 days.

(21) Appl. No.: 15/525,276

(22) PCT Filed: Nov. 5, 2015

(86) PCT No.: PCT/IB2015/002053
§ 371 (c)(1),
(2) Date: May 8, 2017

(87) PCT Pub. No.: WO2016/071748
PCT Pub. Date: May 12, 2016

(65) Prior Publication Data
US 2018/0283271 A1    Oct. 4, 2018

(30) Foreign Application Priority Data

Nov. 6, 2014 (IT) .............................. MI2014A1907

(51) Int. Cl.
*F02B 43/10* (2006.01)
*B60K 15/00* (2006.01)
(Continued)

(52) U.S. Cl.
CPC ............. *F02B 43/10* (2013.01); *B01D 53/24* (2013.01); *B60K 15/00* (2013.01); *B60K 15/10* (2013.01);
(Continued)

(58) Field of Classification Search
CPC .......... F02B 43/10; F02B 47/02; B01D 53/24; B60K 15/10; B60K 15/00;
(Continued)

(56) References Cited

U.S. PATENT DOCUMENTS 3,102,003 A * 8/1963 Kummer ................. C01B 3/047
423/658.2
3,126,266 A * 3/1964 Meisler ................... C01B 3/506
62/639
(Continued)

FOREIGN PATENT DOCUMENTS

WO          98/40922 A1     9/1998
WO       2013/119281 A1     8/2013

OTHER PUBLICATIONS

International Search Report in corresponding application dated May 4, 2016.

*Primary Examiner* — Jacob M Amick
*Assistant Examiner* — Charles Brauch
(74) *Attorney, Agent, or Firm* — Hedman & Costigan, P.C.; James V. Costigan; Kathleen A. Costigan

(57) ABSTRACT

A hydrogen generator for use with an inner combustion engine or other apparatus, even of a movable type, such as a home gas kitchen, said hydrogen generator comprises a system for separating hydrogen from ammonia, said system comprising a $NH_3$ tank, an ammonia sucking pump, and a cracking oven containing a catalyst, an electric resistance and a $H_2/N_2$ separating centrifuge and including a suction device comprising a filter followed by a bottle for providing a feeding volume necessary for the produced hydrogen to compensate for user system requirement variations.

8 Claims, 5 Drawing Sheets

(51) Int. Cl.
  *B01D 53/24*   (2006.01)
  *B60K 15/10*   (2006.01)
  *C01B 3/04*    (2006.01)
  *C01B 3/50*    (2006.01)
  *F02B 47/02*   (2006.01)
  *F02M 21/02*   (2006.01)
  *F02M 27/02*   (2006.01)
  *B60K 15/03*   (2006.01)

(52) U.S. Cl.
  CPC ............... C01B 3/047 (2013.01); C01B 3/50 (2013.01); F02B 47/02 (2013.01); F02M 21/0227 (2013.01); F02M 27/02 (2013.01); *B60K 2015/03315* (2013.01); *C01B 2203/0277* (2013.01); *C01B 2203/0465* (2013.01); *Y02E 60/364* (2013.01); *Y02T 10/32* (2013.01); *Y02T 90/42* (2013.01)

(58) Field of Classification Search
  CPC . B60K 2015/03315; C01B 3/047; C01B 3/50; C01B 2203/0277; C01B 2203/0465; F02M 27/02; F02M 21/0227
  See application file for complete search history.

(56) References Cited

U.S. PATENT DOCUMENTS

| | | | | |
|---|---|---|---|---|
| 3,406,496 A * | 10/1968 | Betteridge | ............... | C01B 3/508 95/104 |
| 3,572,297 A * | 3/1971 | Murray | ................... | F02B 43/10 123/1 A |
| 3,608,529 A * | 9/1971 | Smith | .................... | F02B 47/00 123/1 A |
| 3,608,660 A * | 9/1971 | Smith | .................... | F02B 47/00 123/1 A |
| 3,976,395 A * | 8/1976 | Kalnin | ................... | F04D 1/063 415/199.2 |
| 4,508,064 A * | 4/1985 | Watanabe | ............... | F01K 21/02 123/1 A |
| 5,451,386 A * | 9/1995 | Collins | .................. | B01D 53/22 423/237 |
| 6,516,905 B1 | 2/2003 | Baumert | | |
| 7,585,338 B2 * | 9/2009 | Yoshizaki | .............. | B01J 16/005 123/3 |
| 8,206,470 B1 * | 6/2012 | Jacobson | ............... | F02M 43/00 44/387 |
| 2004/0003781 A1 * | 1/2004 | Yuki | ........................ | F02B 47/02 123/25 C |
| 2006/0048808 A1 * | 3/2006 | Ruckman | ................. | C01B 3/042 136/206 |
| 2006/0099123 A1 * | 5/2006 | Seeley | .................. | B01D 53/047 423/237 |
| 2007/0028905 A1 * | 2/2007 | Shinagawa | ............... | C01B 3/26 123/575 |
| 2009/0056224 A1 * | 3/2009 | Kaufman | .................. | C01B 3/24 48/198.3 |
| 2009/0068090 A1 * | 3/2009 | Cherry | ................. | B01J 19/1806 423/658.2 |
| 2009/0304574 A1 * | 12/2009 | Ravikumar | ............. | C01B 3/047 423/658.2 |
| 2010/0313840 A1 * | 12/2010 | Day | ......................... | C01B 3/12 123/1 A |
| 2011/0011354 A1 | 1/2011 | Dincer | | |
| 2011/0220039 A1 * | 9/2011 | Nowicki | ................... | C25B 9/06 123/3 |
| 2012/0015802 A1 * | 1/2012 | Okamura | ................ | B01J 23/002 502/73 |
| 2012/0148925 A1 * | 6/2012 | Grannell | ................. | C01B 3/047 429/408 |
| 2012/0227713 A1 * | 9/2012 | Kuroki | .................... | F02D 21/08 123/568.11 |
| 2013/0104850 A1 * | 5/2013 | Long | ........................ | F02B 19/12 123/445 |
| 2013/0126675 A1 * | 5/2013 | Heppe | ...................... | B64B 1/00 244/126 |
| 2014/0105816 A1 | 4/2014 | Grannell | | |
| 2014/0230778 A1 * | 8/2014 | Grannell | ............. | F02M 25/038 123/25 P |
| 2014/0261303 A1 * | 9/2014 | McAlister | ............. | F02M 57/06 123/297 |
| 2014/0311135 A1 | 10/2014 | Miyagawa | | |
| 2014/0322124 A1 * | 10/2014 | Izaki | .................... | C01C 1/12 423/352 |

\* cited by examiner

HYDROGEN GENERATOR AND NON-POLLUTING INNER COMBUSTION ENGINE FOR DRIVING VEHICLES

BACKGROUND OF THE INVENTION

The present invention relates to a hydrogen generator and to a vapor or steam inner combustion engine using the generated hydrogen as a fuel to provide work.

The document U.S. Pat. No. 6,516,905 discloses a vehicle including a fuel cell system and an operating method thereof.

The electric power or energy generated by a vehicle alternator 6 is used to produce hydrogen as a fuel or combustible material for a fuel cell system 10, as the combustion engine 2 operates, the generated hydrogen being stored in a hydrogen tank 8 (not shown). With the engine 2 not operating, hydrogen is consumed in the fuel cell system 10 and electric power is supplied by a fuel cell stack 11.

In this document, hydrogen is generated by an electrolyzer 9, driven by the vehicle alternator 6, electrolyzing water from a water feeding tank 19.

Thus, in this document, electric power generated by the vehicle alternator is used for electrolyzing water, to generate by electrolysis hydrogen and oxygen, with the vehicle in an operating condition, hydrogen being used, with the vehicle in a non-operating condition or exclusively as a fuel for the fuel cell system 10.

SUMMARY OF THE INVENTION

The aim of the present invention is to provide a hydrogen generator to provide, by burning the hydrogen generated thereby, a non-polluting thermomechanical work, while preventing explosions.

This result, which has been in vain attempted to be achieved so far by separating post-combustion generated oxides by chemical elements included in the comburent and combustible molecule (mainly consisting of air and hydrocarbons) may be now easily achieved.

The above can be achieved by separating, before the combustion, all the chemical elements producing by combustion carbon and nitrogen oxide exhausting polluting elements.

The above separation is achieved, as it will be disclosed in a more detailed manner hereinafter, due to the mentioned element physical characteristics, such as their atomic weight difference, by centrifuging their gases.

Thus, by the above method, it is possible to separate both oxygen from air, as a comburent material, and hydrogen from industrial ammonia, by cracking ammonia, as a fuel material.

In fact, the chemical compound selected for generating hydrogen is ammonia, $NH_3$, said hydrogen being generated by the following chemical reaction: $2NH_3 \leftrightarrow N_2 + 3H_2$.

In particular, the hydrogen being generated is so drawn as to cause the available ammonia to be fully exhausted.

This reaction is carried out in an oven at about 600° C. in presence of Fe as a catalyst, and requires an energy amount much smaller than that required for separating the water molecule hydrogen, because of a less affinity between hydrogen and nitrogen compared to that between hydrogen and oxygen.

The cracking apparatus may be directly installed on board of a motor vehicle, whereas, for separating hydrogen from water, it would be necessary to install on the vehicle equipments of unpractical weight and size.

Thus, instead of large size and weight hydrogen or hydride bottles or cryo-containers very difficult to be controlled, on the vehicle are mounted very small liquid ammonia containers at a pressure of 8 atm or an ammonia water solution vessel which, at an environment temperature of 15° C., could contain a solution of about 800 liters ammonia per liter of water, as it will be disclosed in a more detailed manner hereinafter.

However, the above process is not the only process adapted to physically separate hydrogen and oxygen for providing the selected thermodynamic cycle combination.

In fact, active membranes could be used; however, for the sake of simplicity, the following disclosure will be referred only to the first of the two above processes, since the gas separation by centrifugation process would be the most familiar one.

To the above it should moreover be added that the gas separating centrifugation process would not provide high purity gases, but only highly enhanced fractions, thereby being fully compatible with the performance to be achieved, that is drastically reducing the polluting combination substance amount, which, both for air and ammonia, would be only marginally related to the waste nitrogen oxides.

Accordingly, the method herein proposed for selecting and using the combustible and fuel materials (i.e. high enrichment or low purity hydrogen and oxygen, respectively) is specifically designed to meet the requirements of eliminating any atmospheric pollution risk in large urban environments.

The above advantage, while being per se very important, is not however the only one which can be achieved by the inventive system, as it will become more apparent hereinafter.

The above objects, as well as yet other objects which will become more apparent hereinafter, are achieved by a system including a hydrogen generator and a non polluting inner combustion engine for driving vehicles in general.

BRIEF DESCRIPTION OF THE DRAWINGS

Further characteristics and advantages of the present invention will become more apparent from the following disclosure of a preferred, though not exclusive, embodiment of the invention which is illustrated, by way of an indicative but not limitative example, in the accompanying drawings, where.

DESCRIPTION OF THE PREFERRED EMBODIMENTS

Figure 1:
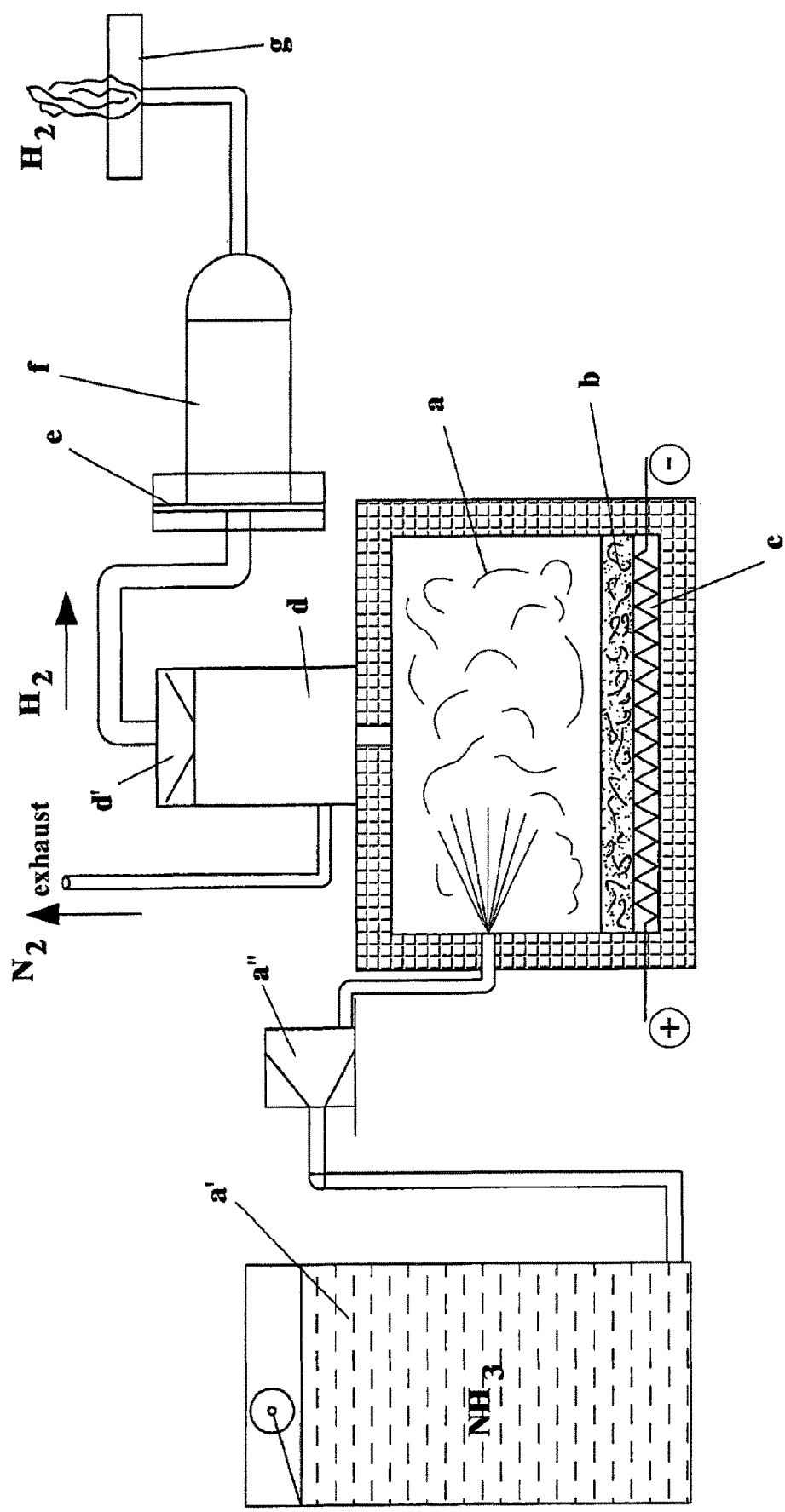
FIG. 1 is a schematic view showing the hydrogen generator.

With reference to the number references of the above mentioned figures, the hydrogen generator, according to the present invention, comprises a system for separating hydrogen from ammonia, said system including a $NH_3$ tank a', a $NH_3$ suction pump a" and a cracking oven a.

The cracking oven a contains the catalyst b and an electric resistance c.

A $H_2/N_2$ separating centrifuge d is built-in in the oven a and comprises a suction device d' including a preferably ceramics filter c followed by a small hydrogen bottle f for providing the hydrogen amount necessary for compensating for possible user system variations.

From the separating centrifuge d two ducts extend, one of which is provided for discharging into the environment the ammonia nitrogen (which is not used) and the other of which is provided for feeding the generated hydrogen to its user system, indicated by way of an example by a home gas kitchen flame g, as a further possible illustrative application.

Thus, the thermal energy of the above gas may be used, in an absolutely safe manner, for different applications and movable systems, since it is free of poisonous or toxic polluting substances, and of explosion dangers.

The ceramics filter e is "transparent" to the hydrogen molecules and "opaque" to the nitrogen molecules.

The above system may be advantageously used in vehicles such as cars, as a thermal energy feeding system providing thermal energy to a thermodynamic operating cycle based on a combustion temperature control, as it will be disclosed hereinafter.

In existing inner combustion engines, in order to determine the engine displacement, and accordingly the maximum power supplied thereby, the air amount to be sucked by its cylinder (or cylinder assembly) is at first evaluated.

Then, from the mentioned sucked air amount, the fuel amount to be fed to the cylinder to provide a full combustion is determined.

This is achieved by calculating the combustible and comburent element stechiometric ratio, with a necessary safety tolerance.

In this connection it should be pointed out that oxygen (that is that air part actually having the comburent gas function) represents about $\frac{1}{5}$ by weight of the air supplied amount, the remaining $\frac{4}{5}$ part consisting of non-combustible nitrogen gas, generating an undesired very high noxious oxide amount.

It should be also pointed out that in the conventionally used combustible or fuel material, consisting in most cases of a hydrocarbon, any hydrogen molecule is associated with several carbon atoms participating in the combustion and producing a part of the useful work, as well as oxide and anhydride polluting substances.

If a combustion occurs, as in the present invention, between a nearly pure hydrogen and oxygen, then no polluting substances will be generated, but, as is known, a very high combustion temperature, much higher than that compatible with the mechanical strength of the materials used for making the engine, will be obtained.

This drawback, also affecting prior reciprocating piston engines, will be worsened if rotary inner combustion engines are adopted on a large scale, as it will be discussed hereinafter, and as the case would be if the use of hydrogen will spread in a near future.

The invention provides to eliminate part of the fuel generated heat, by strongly cooling the engine head.

Up to now, this loss has been commonly accepted both by the engine designers and users, who have considered it as a tribute to be paid for using the residual heat.

However, the question should be asked if the above sacrifice is really inevitable, when considering, on one side, its economical importance and, on the other side, the fact that the above loss would be further aggravated in using advanced engines, improved with respect to prior reciprocating piston engines, which are conceptually obsolete.

Actually, in prior engines, the above loss exceeds, because of cooling and radiating, a rate of 25% of the heat supplied by the fuel, and in a higher "power concentration" engine, such as a rotary one, it could even be 35% or more, thereby the development of such engines would become questionable, since the yield of a prior endothermic engine cannot exceed 35% of the heat amount potentially contained in the hydrocarbons.

In order to overcome the above mentioned loss, it would be sufficient to differently design the engine, by the inventive novel concept of controlling its cycle maximum temperature according to requirements, that is by using as the engine main designing parameters, instead of the sucked comburent air amount, the heat amount potentially contained in the fuel and by moderating the cycle maximum temperature, by injecting into the cylinder a liquid water amount adapted to transform into a pressure the generated heat excess above that which could be borne by the engine materials, that is by introducing in the engine cylinder an atomized water amount so calculated as to transform into steam by the hydrogen combustion generated heat.

Thus, the average pressure of the cycle and accordingly also the work generated by the piston or pistons will be greatly enhanced.

Thus, by properly designing the injected water amount, the combustion chamber maximum temperature will be held within the desired values and the expansion of the water steam will cool it to the condensing and exhausting temperature.

If the exhausting cycle temperature is still considered too high (thereby reducing the thermal hopping of the cycle and accordingly its thermodynamic yield), then it would be possible to perform a second atomized water injection during the end steam expansion stroke, upon controlling its temperature.

Thus, by using two temperature probes, one at the combustion chamber and the other near the exhausting system, and by associating therewith two fully automatized atomized water injector/metering devices, it will be possible to provide a thermodynamic cycle substantially corresponding to that calculated in the designing job, as well as an efficiency always near to the maximum one.

To the above it should be added that the use of water to moderate the cycle temperature would allow to held within low values the total engine displacement required and accordingly the engine weight and size, which would be very important for an average or low pressure hydrogen engine since the potential heat contents of hydrogen at atmospheric pressure is just 2.48 Kcal/liter.

Thus, from the above it should be apparent that an adoption of the proposed operating cycle allows to use all the work provided by the combustible material without using any dedicated system for cooling the engine heads which, because of its complexity and delicate structure, is frequently a source of operating failures in extreme climates or use conditions of the vehicle.

Figure 2:
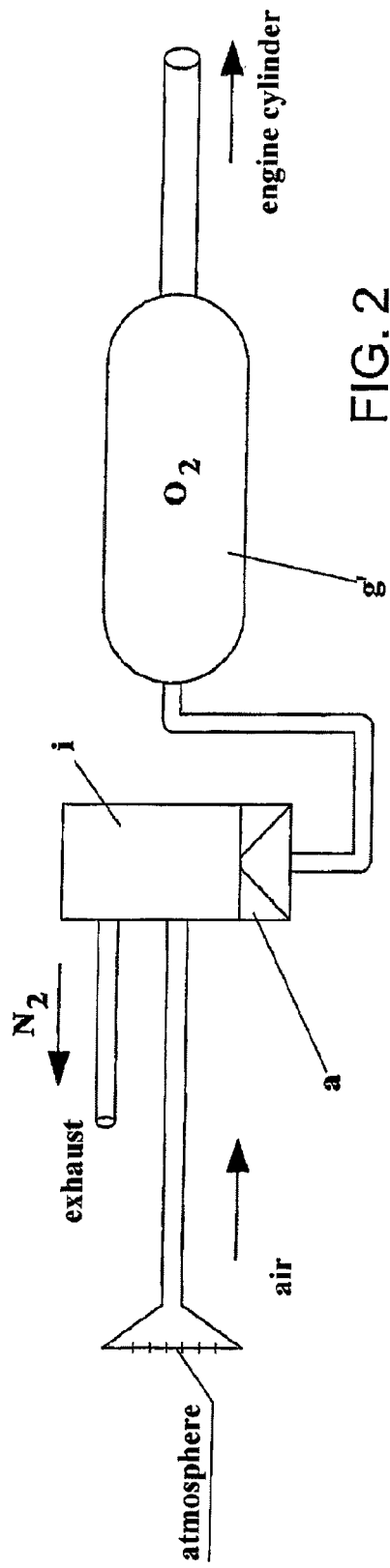
FIG. 2 is a block diagram showing the apparatus for separating oxygen from air.

For applying to an inner combustion engine the hydrogen generator shown in FIG. 1, it is necessary to add to the latter the system shown in FIG. 2, that is the apparatus for separating oxygen from air and use the separated oxygen as the sole hydrogen comburent element.

However, the above additional apparatus would not be necessary if the combustion temperature control could prevent the achievement of cylinder temperatures above which nitrogen oxides are formed.

FIG. 2 shows a block diagram of the system for separating oxygen from air by centrifuging air in an $O_2/N_2$ centrifuge i, a compressor a and a net filter h' and, finally, an $O_2$ accumulating and compensating bottle g'.

Figure 3:
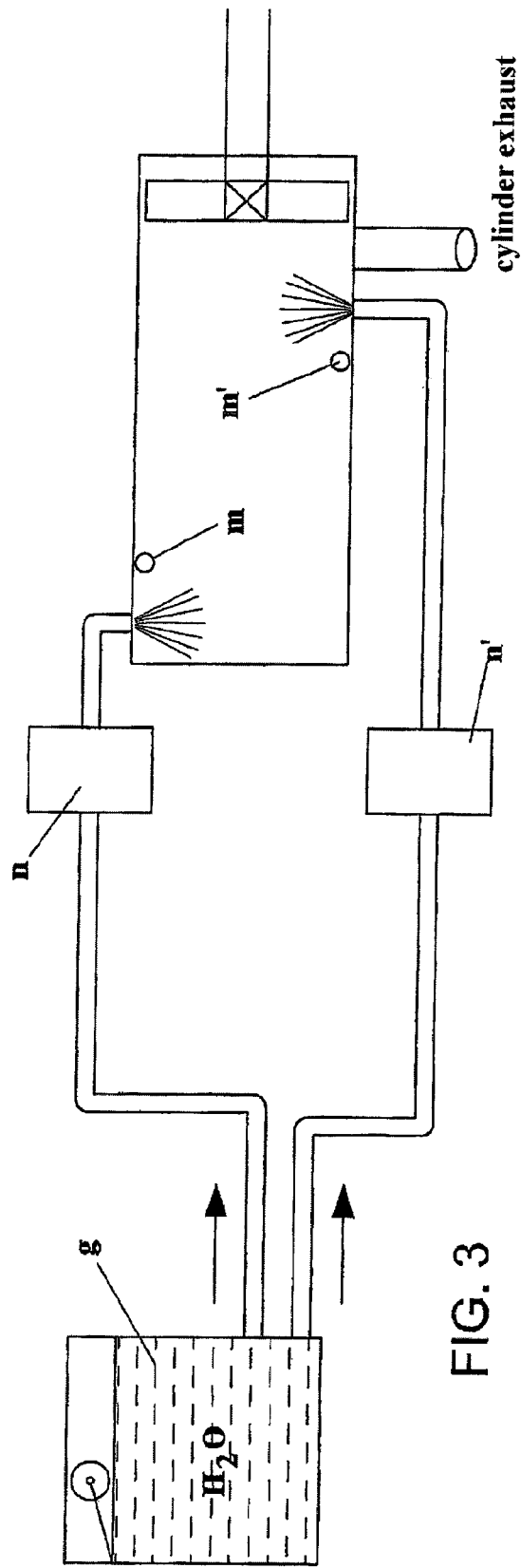
FIG. 3 is a schematic view of the $H_2O$ metering/atomizing devices applied to an engine cylinder.

FIG. 3 shows a $H_2O$ metering/atomizer device applied to a cylinder schematically indicated by R.

In FIG. 3, the letter g indicates the $H_2/O_2$ combustion condensating water, n and n' indicate the $H_2O$ atomizer and injector devices, and m and m' indicate the temperature probes.

It has been previously pointed out that an ideal engine for using a hydrogen fuel is not a reciprocating piston inner combustion engine.

However, the above does not mean that a reciprocating piston engine could not be used with hydrogen (as it is used indeed with small modifications to the operation with gaseous hydrocarbons), but merely means that a reciprocating piston engine is not the most suitable one to provide from a hydrogen fuel all the advantages which could be achieved by other mechanisms.

In fact, the high number of operating cycles a rotary type of engine can afford would greatly aid the achievement of a high power with a reduced displacement, size and weight.

The same considerations are also true for the very high flame temperature, for simplifying the respective compared mechanisms and for the very high efficiency of the inner heat exchanges, provided that, if the inevitable limitations due to the old engine adaptation to a hydrogen feeding and its reduced performance are accepted, then most of the existing vehicles could be adapted to the novel use, in particular when it is possible, as it is likely at least for most cases, to fit the use of the specific reciprocating piston engine type to an alternative use of two different fuels, such as a gaseous hydrocarbon and hydrogen, by switching from one to the other depending on requirements.

Obviously, the above should be specifically studied case by case.

Anyhow, in the subject hydrogen vehicle, the only fluid to be periodically fed is ammonia, and the only exhausting operation to the atmosphere is that of a nitrogen amount, without polluting components.

Lastly, it would be suitable to verify the efficiency of ammonia as a heat (and accordingly energy) carrier, both with respect to the vehicle range between two refueling operations, and for establishing the frequency of the refueling points on the involved area.

In this connection it should be pointed out that ammonia may be distributed in different forms, that is liquefied in bottles at a pressure of 8 atm, as well as dissolved in water, since at an environment pressure and at a temperature of 15° C. it can be water dissolved in an amount of 800 liters of ammonia per liter of water (the weight of the gaseous ammonia at 0° C. and 76 mm/hg is 0.771 kg/liter and the weight of liquid ammonia is 0.614 kg/liter.

As to the thermal energy provided by ammonia compared with the thermal energy provided by gasoline, the following data should be considered: for each burnt gasoline kg are achieved 12.2 kWh, for each hydrogen kg are achieved 34.7 kWh and since the ammonia gram molecule contains 0.176 $H_2$, 1 kg ammonia will contain 3*1000/17=176.5 g $H_2$ which, upon burning, provide 6.12 kWh, that is about a half of the kWh provided by gasoline per conveyed weight unit.

The weight increase e related to the on board conveyed liquid as a reserve fuel, compared with gasoline, at a same power contents, would be accordingly easily allowable, since anyhow it is much lower than that of the high pressure bottles for transporting pressurized hydrogen, in gaseous form, or that of the cryogenic vessels for transporting it in a liquid form, or in a hydride form, and the related adjusting and delivery system.

From a safety standpoint, on the other hand, a transport of ammonia under any forms would be absolutely preferable to that of hydrogen, in particular when considering the frequency of road accidents in the large town traffic.

Figure 4:
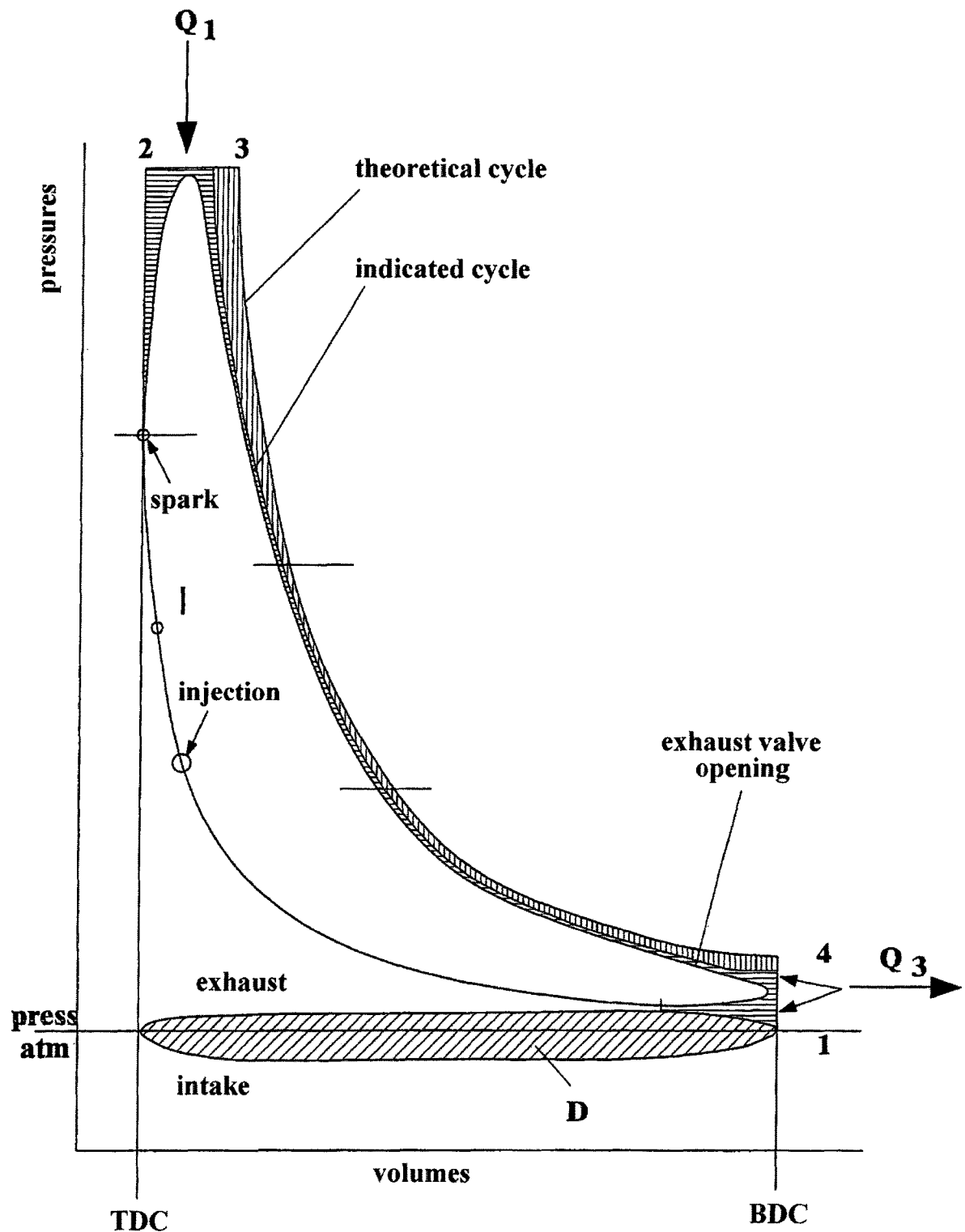
FIG. 4 is an example of a thermodynamic cycle showing the starting of the expansion of the vapor or steam amount produced by the combustion and an exhausting of the vapor into a recovering vessel therefor.

FIG. 4 shows a thermodynamic cycle which could be used for practically performing the inventive cycle, of course apart from the actual positions of the several characteristic points indicated in the cycle itself, which would be subjected to an experimental verification to be precisely determined.

With the exception of the inlet and outlet strokes, which are nearly equal to those which are conventional for all the inner combustion engines, the compression stroke is divided into three parts, in the first of which is introduced the comburent material which, as shown, may be air or oxygen, and in the second of which is injected hydrogen and atomized water as a thermal moderating agent, and in the third of which is performed the igniting of the mixture with a certain advancing with respect to the top dead center.

Then, the combustion steam expansion starts and at last the steam will be exhausted into the steam recovery vessel, not shown in FIG. 4.

Figure 5:
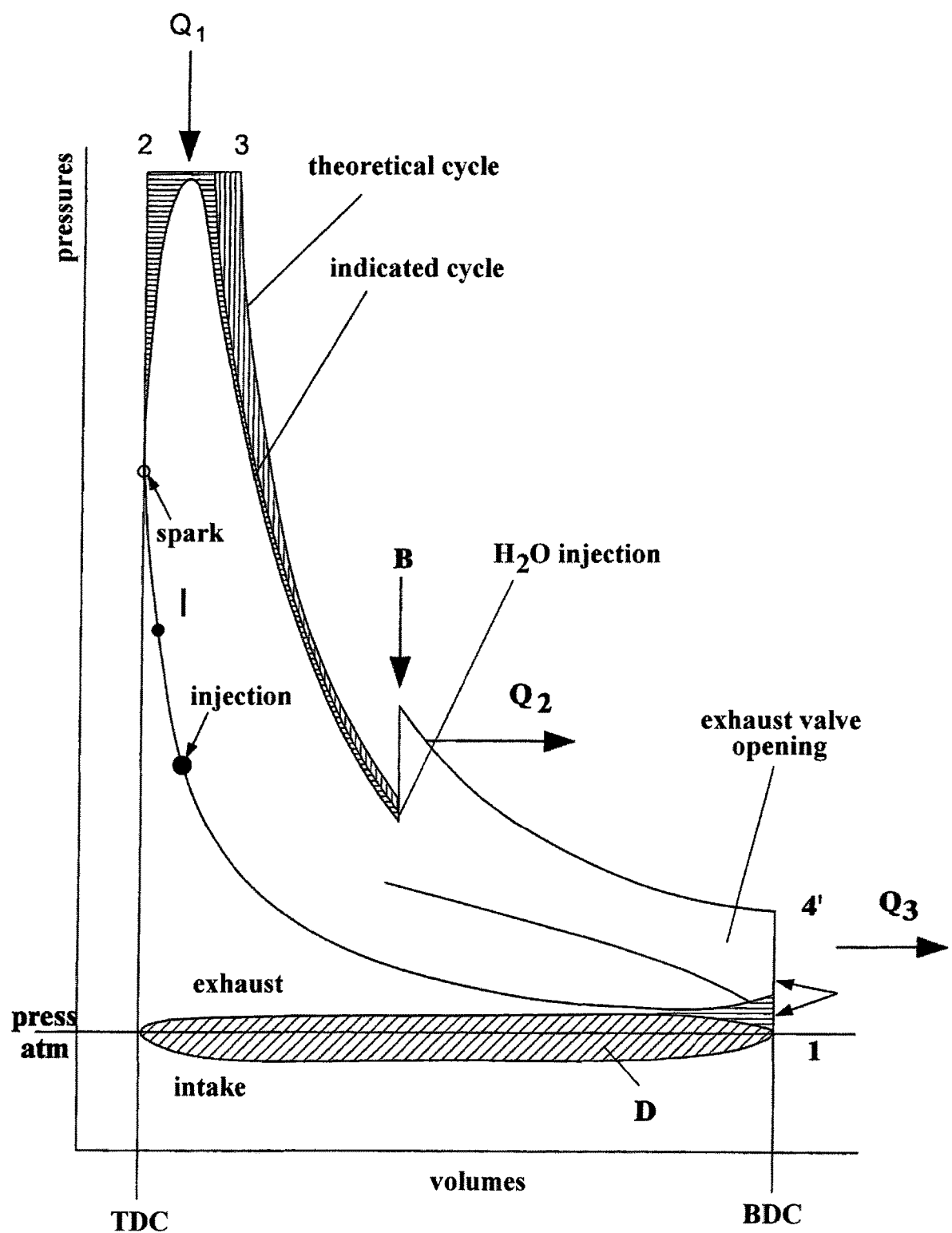
FIG. 5 shows that same operating cycle but with an additional $H_2O$ injection, carried out to reduce the vapor or steam exhausting temperature.

FIG. 5 shows that same operating cycle in case of performing an additional $H_2O$ injection to reduce the steam exhausting temperature.

Figure 6:
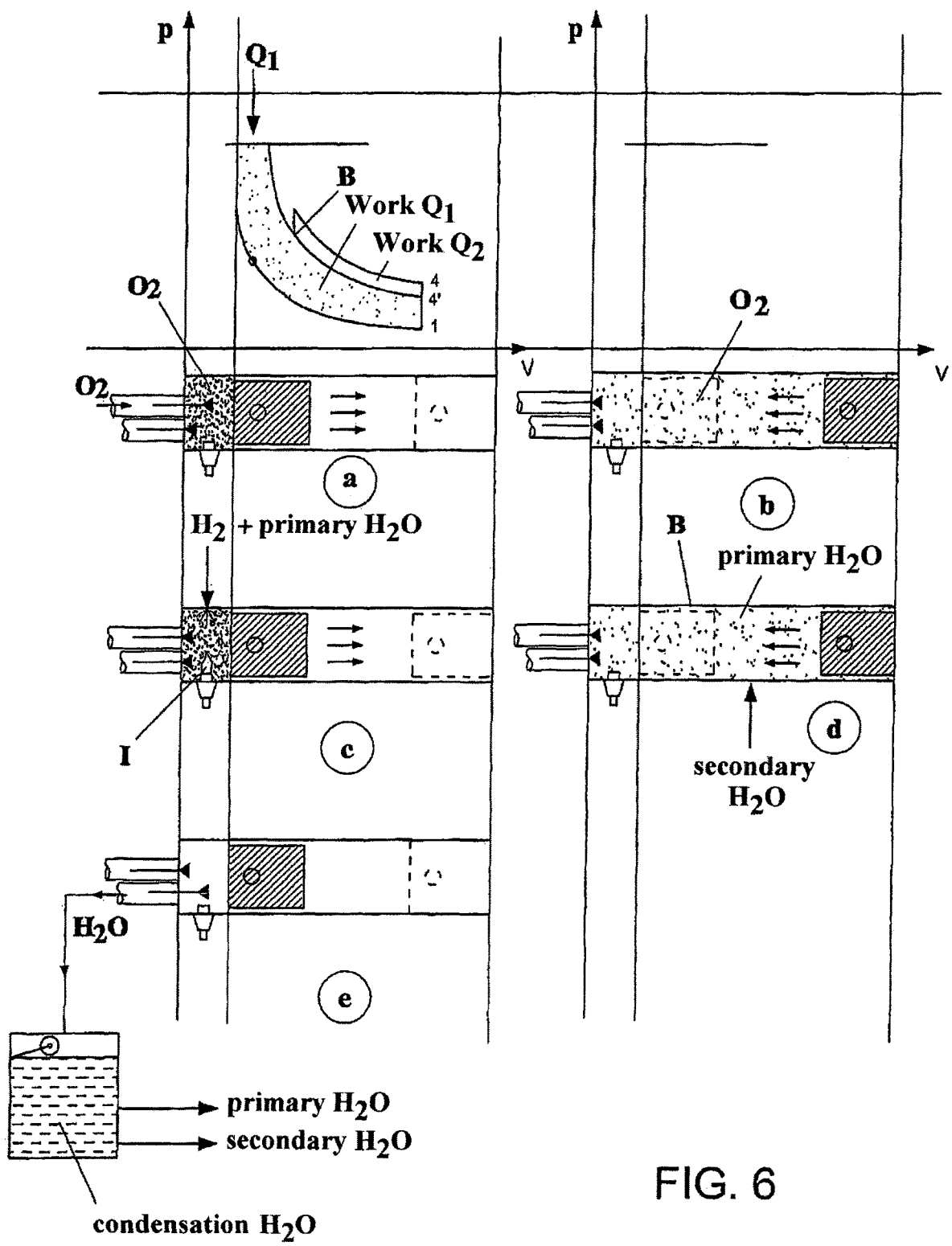
FIG. 6 schematically shows the operating strokes of the engine.

FIG. 6 shows the engine operating strokes.

It has been found that the invention fully achieves the intended aim and objects.

In practicing the invention, the materials used, as well as the contingent size and shapes can be any, according to requirements.

The invention claimed is:

1. A vehicle comprising an internal combustion engine and a hydrogen generator arranged on-board said vehicle for providing hydrogen as a fuel to said internal combustion engine, said hydrogen generator comprising a system for separating hydrogen from ammonia, said system comprising:

an ammonia tank containing ammonia,
an ammonia sucking pump for pumping ammonia from said ammonia tank,
a cracking oven arranged for receiving ammonia from said ammonia sucking pump,
a catalyst arranged inside said cracking oven,
an electric resistance arranged inside said cracking oven,
an $H_2/N_2$ separating centrifuge connected to said cracking oven and comprising an $N_2$ exhaust duct, for exhausting into the environment nitrogen separated from ammonia, and an $H_2$ feeding duct,
a suction device connected to said $H_2/N_2$ separating centrifuge and arranged for feeding generated hydrogen into said $H_2$ feeding duct,
a filter arranged on said $H_2$ feeding duct, and
a bottle arranged downstream of said filter for storing said generated hydrogen and for providing a feeding volume necessary for said generated hydrogen produced from said hydrogen generator to compensate for system requirement variations,
said internal combustion engine comprising at least one cylinder operating by conventional suction and exhausting engine strokes, said $H_2$ feeding duct being connected to said at least one cylinder for feeding said generated hydrogen into said at least one cylinder, said vehicle further comprising an oxygen supply connected to said at least one cylinder for supplying oxygen to said at least one cylinder, said vehicle further comprising a water metering/atomizer device connected to said at least one cylinder for supplying atomized water to said at least one cylinder.

2. The vehicle according to claim 1, wherein said ammonia is a commercial liquid ammonia, or a water solution thereof at an environment temperature and pressure, ammonia vapors being processed in an electric oven at a temperature of 600° C., in presence of Fe as said catalyst, according to the reaction $2NH_3 \leftrightarrow N_2 + 3H_2$ and then exhausting non-used nitrogen into the environmental atmosphere.

3. The vehicle according to claim 1, wherein said ceramics filter is permeable to hydrogen molecules and impermeable to nitrogen molecules.

4. The vehicle according to claim 1 wherein said internal combustion engine is a single-cylinder or multiple-cylinder internal combustion engine operating by conventional suction and exhausting engine strokes, wherein said internal combustion engine comprises a compression stroke divided into three parts, in the first part of which a comburent oxygen containing substance is introduced, in the second part of which hydrogen produced by said hydrogen generator and atomized water as a thermal moderating agent are introduced, and in the third part of which is performed, with an advance with respect to an engine top dead center, an ignition of the fuel mixture, and then an expansion of the vapor charge produced by the combustion being started and finally a vapor exhausting being performed.

5. The vehicle according to claim 4, wherein the hydrogen and oxygen mixture compressed in said engine cylinder or cylinders is ignited by an electric spark and burns while producing a mechanical work.

6. The vehicle according to claim 4, wherein said cylinder has an inner temperature controlled and modified by injecting, at preselected times of the expansion stroke of the water steam produced by a combustion, by a calculated and programmed injection of atomized water amounts for mating the temperature of the thermodynamic cycle to the designed temperatures.

7. The vehicle according to claim 1, wherein said water metering/atomizer device comprises two water atomizer and injector devices adapted to inject atomized water respectively at opposed zones of said cylinder, and two temperature probes arranged respectively at said opposed zones.

8. The vehicle according to claim 1, further comprising a system for separating oxygen from air for supplying said oxygen supply to said cylinder, said system for separating oxygen from air comprising a centrifuge, a compressor, a filter, and an oxygen accumulating and compensating bottle connected to said cylinder.

* * * * *